US012798310B2

(12) United States Patent
McCarthy et al.

(10) Patent No.: US 12,798,310 B2
(45) Date of Patent: Nov. 17, 2026

(54) AUTOMOTIVE TOW HITCH DEVICE

(71) Applicant: MAXTRAX AUSTRALIA PTY LTD, Nundah (AU)

(72) Inventors: Bradley John McCarthy, Banyo (AU); Neil Davidson, Woolloongabba (AU); Alexandra French, Woolloongabba (AU); Paul Toohey, Geebung (AU)

(73) Assignee: Maxtrax Australia Pty Ltd., Nundah (AU)

( * ) Notice: Subject to any disclaimer, the term of this patent is extended or adjusted under 35 U.S.C. 154(b) by 838 days.

(21) Appl. No.: 17/269,867

(22) PCT Filed: Oct. 11, 2019

(86) PCT No.: PCT/AU2019/051102

§ 371 (c)(1),
(2) Date: Feb. 19, 2021

(87) PCT Pub. No.: WO2020/073095

PCT Pub. Date: Apr. 16, 2020

(65) Prior Publication Data

US 2021/0252926 A1 Aug. 19, 2021

(30) Foreign Application Priority Data

Oct. 12, 2018 (AU) ................................ 2018903856

(51) Int. Cl.
*B60D 1/52* (2006.01)
*B60D 1/02* (2006.01)
(Continued)

(52) U.S. Cl.
CPC ................. *B60D 1/52* (2013.01); *B60D 1/02* (2013.01); *B60D 1/18* (2013.01); *B60D 1/58* (2013.01); *B60D 1/243* (2013.01)

(58) Field of Classification Search
CPC ... B60D 1/18; B60D 1/02; B60D 1/52; B60D 1/58
See application file for complete search history.

(56) References Cited

U.S. PATENT DOCUMENTS 3,583,749 A 6/1971 Hopkins
5,647,198 A * 7/1997 Mihailovic ............ F16G 15/06 59/93

(Continued)

FOREIGN PATENT DOCUMENTS

AU 2018201290 9/2018
DE 102014200722 7/2015

(Continued)

OTHER PUBLICATIONS

European Search Report on related foreign application (EP Application No. 19871429.7) from the European Patent Office dated Jun. 14, 2022; 10 pages.

(Continued)

*Primary Examiner* — Kevin Hurley
*Assistant Examiner* — Michael R Stabley
(74) *Attorney, Agent, or Firm* — Michael Best & Friedrich; Paul E. Szabo

(57) ABSTRACT

The present invention relates to an automotive tow hitch device including a body for coupling to a vehicle, and defining a receiver for receiving a shackle arrangement for coupling to another vehicle. Advantageously, either vehicle can be used to tow and extract the other vehicle when stuck using the shackle arrangement.

16 Claims, 1 Drawing Sheet

(51) Int. Cl.

*B60D 1/18* (2006.01)
*B60D 1/58* (2006.01)
*B60D 1/24* (2006.01)

(56) References Cited

U.S. PATENT DOCUMENTS

| | | | | |
|---|---|---|---|---|
| 5,671,938 | A | 9/1997 | Olson | |
| 6,158,760 | A | 12/2000 | Kiss | |
| 6,923,463 | B1 * | 8/2005 | Ford | B60D 1/36 248/479 |
| D598,817 | S * | 8/2009 | Najarro | D12/162 |
| 7,871,097 | B2 | 1/2011 | Sparkes et al. | |
| 8,205,922 | B1 * | 6/2012 | Ohman, Jr. | F16G 15/06 294/82.11 |
| 8,328,223 | B2 * | 12/2012 | Leinenger | B60D 1/30 280/495 |
| 8,371,603 | B2 | 2/2013 | Columbia | |
| 8,636,297 | B2 * | 1/2014 | Merten | B60D 1/02 280/480 |
| D757,518 | S * | 5/2016 | Najarro | D8/339 |
| 9,744,820 | B1 | 8/2017 | Robins | |
| D823,736 | S * | 7/2018 | Montes | D12/162 |
| D826,036 | S | 8/2018 | Worswick et al. | |
| 2002/0140206 | A1 * | 10/2002 | Lloyd | B60D 1/07 280/491.5 |
| 2006/0087101 | A1 | 4/2006 | Yon | |
| 2013/0088000 | A1 | 4/2013 | Boyte | |
| 2014/0265249 | A1 | 9/2014 | Hood et al. | |

FOREIGN PATENT DOCUMENTS

| | | |
|---|---|---|
| DE | 102017205909 | 10/2018 |
| EP | 2080644 | 7/2009 |
| WO | WO2007024452 | 3/2007 |
| WO | WO2014152204 | 9/2014 |

OTHER PUBLICATIONS

Factor 55: "Factor 55 Flatlink Products"; Oct. 26, 2016 https:/www.youtube.com/watch?v=grvfDbgdGQo Retrieved from the Internet.

Notification of material filed by a third party on corresponding foreign application (AU Application No. 2021101088) from the Australian Intellectual Property Office dated May 11, 2021; 7 pages.

HitchLink 2.0; http://factor55.com/product/hitchlink/ Printed May 25, 2021; 7 pages.

The Wayback Machine; https://web.archive.org/web/20180925223506/http://factor55.com/product/hitchlin Printed May 25, 2021; 11 pages.

Factor 55 HITCHLINK 2.0 (2" Receivers)—Red: Automotive; https://www.amazon.com/Factor-55-00020-01-Hitchlink-Red/dp/B00JMBS9V0/ref=bmx_7 Printed May 25, 2021; 8 pages.

Bubba Rope Gator-Jaw 176745PRO Synthetic Soft Shackle (52,300LB Breaking Strength) Red & Black; https://www.amazon.com/Bubba-Rope-Gator-Jaw-176745PROSynthetic/dp/B07F489PP7/ref=pd_bxgy_2/138-3235664-8077126 Printed May 25, 2021; 7 pages.

ALL-TOP Nylon Recovery Kit with Hitch Receiver; https://www.amazon.com/ALL-TOP-Nylon-Recovery-Hitch-Receiver/dp/B07MVV638V/ref=sr_1_14?dchild=1&keywords=hitch+ring&gid=1618374197&sr=8-14 Printed May 25, 2021; 10 pages.

Rhino USA Shackle Hitch Receiver; https://www.amazon.com/USA-Receiver-Accessories-Rhino-Receivers/dp/B06WLMF23C/ref=pd_bxgy_img_3/138-3235664-8077126 Printed May 25, 2021; 10 pages.

CURT 45831 D-Ring Shackle Mount Trailer Hitch; https://www.amazon.com/Curt-Manufacturing-45831-D-Ring-Shackle/dp/B079QVX7PX/ref=sr_1_47?dchild=1&keywords=hitch+ring-shackle &qid=1618374478&sr=8-47 Printed May 25, 2021; 10 pages.

Tow Ready 63045 Receiver Mount Tow Eyelet; https://www.amazon.com.au/Ready-63045-Receiver-Mount-Evelet/dp/B001TNMJQK/ref=sr_1_34?dchild=1 Printed May 25, 2021; 4 pages.

Rugged Ridge Elite Giga Hooks; https://ruggedridge.com/p/rugged-ridge-elite-giga-hooks/ Printed May 25, 2021; 6 pages.

Agency 6 Recovery Shackle Block 2" (Double Hole); https:/www.amazon.com/Agency-Recovery-Shackle-Block-Double/dp/B07C8Q9MDP/ref=sr_1_8 Printed May 26, 2021; 6 pages.

The Bubba Rope Gator Jaw Synthetic Shackle Review; Oct. 12, 2016 https://www.youtube.com/watch?v=mTOrKmcpyB0 Retrieved May 27, 2021.

4 × 4 Tough Hitch Pin and Shackle; Aug. 10, 2016 https://www.youtube.com/watch?v=2joRONSTGLY Retrieved May 27, 2021.

Factor 55 HitchLinks; Oct. 27, 2016 https://www.youtube.com/watch?v=fRikYfKANJY&t=1s Retrieved May 27, 2021.

Factor 55 Hitchlink Review; Aug. 21, 2018 https://www.youtube.com/watch?v=AzigQJ9ekBg Retrieved May 27, 2021.

CPO Product Spotlight : Bubba Rope Synthetic Gator Jaw Shackle; Jul. 31, 2016 https://www.youtube.com/watch?v=PqFHQ7YK8x4 Retrieved May 27, 2021.

Recovery Gear Part 1: The Basics; Feb. 12, 2017 https://www.youtube.com/watch?v=15Yn4gT6ubA Retrieved May 27, 2021.

Gator Jaw Synthetic Shackle—Part 1—Introduction; Sep. 26, 2017 https://www.youtube.com/watch?v=8tuOoQfVvy8 Retrieved May 27, 2021.

Rockfab Off-Road—How to Setup Soft Shackle; Nov. 20, 2017 https://www.youtube.com/watch?v=iYhg30kVO6E Retrieved May 27, 2021.

Custom Splice's new Soft Shackle; Mar. 18, 2015 https://www.youtube.com/watch?v=5OAzmnZuH0Q Retrieved May 27, 2021.

Examination report No. 1 on related foreign application (AU Application No. 2021101088) from the Australian Intellectual Property Office dated May 24, 2021; 10 pages.

Examination report No. 2 on related foreign application (AU Application No. 2021101088) from the Australian Intellectual Property Office dated Oct. 6, 2021; 8 pages.

Re-examination report on related foreign application (AU Application No. 2019358971) from the Australian Intellectual Property Office dated Nov. 17, 2021; 16 pages.

Ranger 2" Extended Aluminum Hitch Receiver 3/4" Shackle Adapter; https://www.amazon.com.au/Extended-Aluminum-Receiver-Shackle-Adapter/dp/B072KLTKPY/ref=pd_sbs_4 Published on Jan. 9, 2019; 5 pages.

Quadratec 2" Hitch Receiver D-Ring Shackle Mount; Feb. 24, 2018 https://www.youtube.com/watch?v=xEY3u0cwJso Retrieved Nov. 18, 2021.

Bulldog Winch Off Road Accessories—Tow Hook—Loop—BDW20239 Review; Dec 19, 2015 https://www.youtube.com/watch?v=aeAOrgg6Xn8 Retrieved Nov. 18, 2021.

International Search Report on corresponding PCT application (PCT/AU2019/051102) from International Searching Authority (AUPO) dated Jan. 29, 2020.

Written Opinion on corresponding PCT application (PCT/AU2019/051102) from International Searching Authority (AUPO) dated Jan. 29, 2020.

* cited by examiner

AUTOMOTIVE TOW HITCH DEVICE

CROSS-REFERENCE TO RELATED APPLICATION

This application is the National Phase, under 35 U.S.C. § 371(c), of International Application No. PCT/AU2019/051102, filed Oct. 11, 2019, which claims priority from Australian Application No. AU 2018903856, filed Oct. 12, 2018. The disclosures of all of the referenced applications are incorporated herein by reference in their entirety.

FEDERALLY SPONSORED RESEARCH OR DEVELOPMENT

Not Applicable

TECHNICAL FIELD

The present invention relates to an automotive tow hitch device. The present invention has particular, although not exclusive application to extracting a stuck four-wheel-drive (4WD) vehicle.

BACKGROUND

The reference to any prior art in this specification is not, and should not be taken as an acknowledgement or any form of suggestion that the prior art forms part of the common general knowledge.

There are a host of automotive recovery devices available for extracting stuck 4WD vehicles from mire such as sand and mud.

Snatch straps are designed to stretch under load and can be coupled between the stuck vehicle and a moving vehicle that pulls the stuck vehicle from the mire.

Many 4WD vehicles are fitted with winches which can be used in extreme recovery situations.

The applicant has perceived the need for an alternative automotive recovery device.

SUMMARY OF THE INVENTION

According to one aspect of the present invention, there is provided an automotive tow hitch device including a body for coupling to a vehicle and defining a receiver for receiving a shackle arrangement for coupling to another vehicle.

Advantageously, either vehicle can be used to tow and extract the other vehicle when stuck using the shackle arrangement, which may take the form of that disclosed in AU2018201290 and that is incorporated herein by reference.

The body may define a tail for being received within the vehicle and a head for protruding from the vehicle. The tail may define one or more apertures for receiving respective fasteners. The tail may be squarish. The tail may have a chamfered end to facilitate insertion. The receiver may include an aperture. The aperture may be not more than 23 mm, in the vertical and/or horizonal planes, to inhibit insertion of conventional steel shackles. The aperture may slope and/or fan to reduce wear on the shackle arrangement. The aperture may further slope and/or fan to reduce wear on the shackle arrangement. The aperture may have rounded edges to impede damage to the shackle arrangement 104 under tension.

The head may define the receiver. The head may be rounded. The head may define an inclined end to facilitate reflection of light.

The device may be integrally formed. The device may be CNC formed from billet metal, preferably aluminium. The device may be anodized. The device may be rated to towing 40 tonnes.

Preferably, the shackle arrangement includes a soft shackle. The soft shackle may be formed from resilient or rope material. The soft shackle may include a head for coupling to a tail to form an endless loop passing through the receiver.

According to another aspect of the present invention, there is provided automotive tow hitch system including the device and the shackle arrangement. The system may be provided in kit form.

According to another aspect of the present invention, there is provided an automotive tow method involving:

coupling a body of a device to a vehicle; and coupling a shackle arrangement, received in a receiver of the body, to another vehicle.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
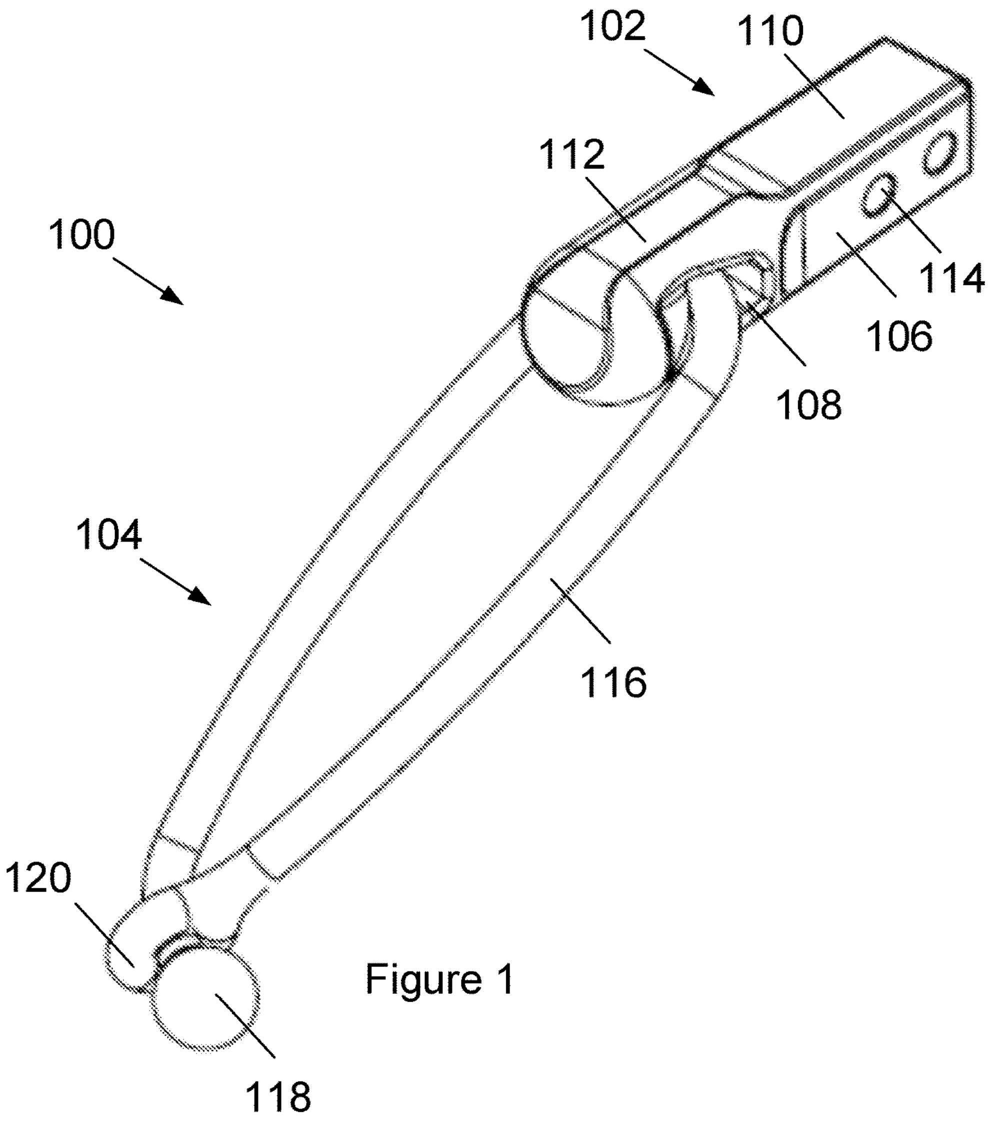
FIG. 1 is an upper perspective view of an automotive tow hitch system in accordance with an embodiment of the present invention.

According to an embodiment of the present invention, there is provided an automotive tow hitch system 100 as shown in FIG. 1. The system 100 includes an automotive tow hitch device 102 coupled to a soft shackle arrangement 104. The system 100 is typically provided in kit form.

The tow hitch device 102 includes a body 106 for coupling to a vehicle, and defines a receiver 108 for receiving the soft shackle arrangement 104, in turn, coupled to another vehicle. Advantageously, either vehicle can be used to tow and extract the other vehicle when stuck using the shackle arrangement 104. The arrangement 104 can take the form of that disclosed in AU2018201290 which is incorporated herein by reference.

The body 106 defines a squarish tail 110 for being complementarily received within a towbar of the vehicle and an enlarged head 112 for protruding from the vehicle toward the other vehicle. The tail 110 defines two apertures 114 for receiving respective fasteners to fasten the body 106 to the vehicle.

The shackle arrangement 104 includes a soft shackle 116, formed from resilient or rope material. The soft shackle 116 includes a head 118 for coupling to a looped tail 120 to form an endless loop passing through the receiver 108.

Figure 2:
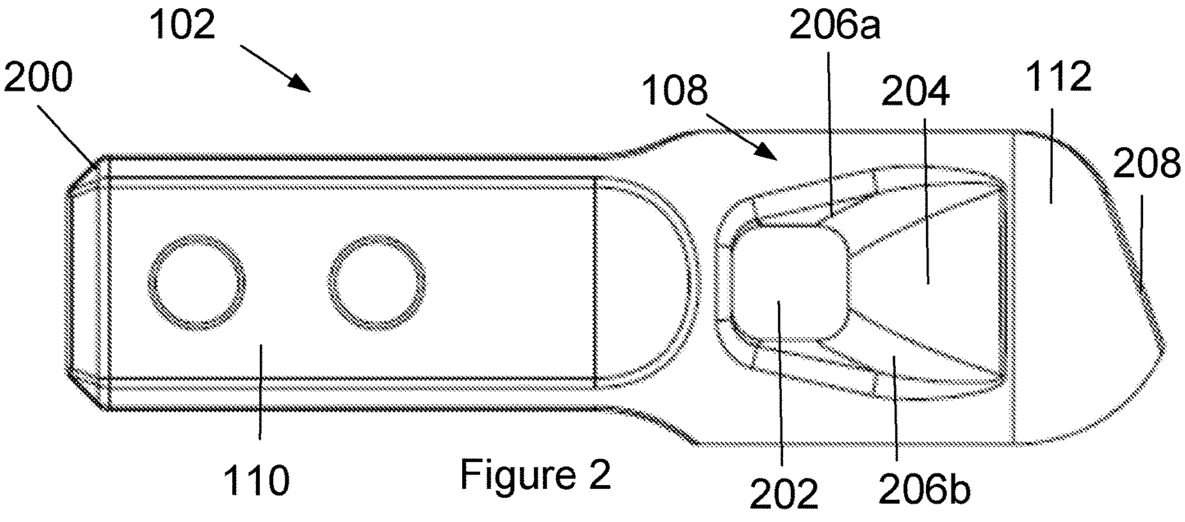
FIG. 2 is a side view of an automotive tow hitch device of the system of FIG. 1.

Turning to FIG. 2, the tail 110 has a chamfered end 200 to facilitate insertion into the vehicle's towbar. The receiver 108 includes a specially shaped aperture 202. The aperture 202 is dimensioned not more than 23 mm in the vertical and horizonal planes to inhibit insertion of conventional steel shackles which could damage the device 102. The aperture also has rounded (i.e. no sharp) edges to impeded damage to the shackle arrangement 104 under tension.

A portion 204 of the aperture 202 slopes and fans to reduce wear on the shackle arrangement 104 pulling in a horizontal direction. Other portions 206*a,b* of the aperture 202 further upwardly and downwardly slope or fan to further reduce wear on the shackle arrangement 104 pulling in a vertical direction.

The head 112 defines the receiver 108 and is rounded at it top and bottom. The head 112 defines an inclined end 208 to facilitate reflection of light as a safety feature.

The device 102 is integrally CNC formed from billet metal, preferably aluminium. The device 102 is anodized to provide a color and is rated to towing up to 40 tonnes.

An automotive tow method using the system 100 is now briefly described.

Firstly, the body 106 of the device 102 is coupled to a vehicle. The tail 110 is inserted in the vehicle's tow bar and the two apertures 114 receive respective fasteners to fasten the body 106 to the vehicle.

Next, the shackle arrangement 104 is received in the receiver 108 of the body 106. The open shackle 116 is threaded through the receiver 108 and its head 118 is coupled to its tail 120. The closed shackle arrangement 104 is then coupled to another vehicle for towing.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An automotive tow hitch device including a body configured for coupling to a first vehicle, and defining a receiver configured for receiving a shackle arrangement for coupling to a second vehicle, wherein the receiver includes a receiver aperture;

the receiver aperture extends horizontally through the body with an aperture opening located on either side of the body, wherein each aperture opening includes three sloped portions to reduce wear on the shackle arrangement when in use;

a first portion of each aperture slopes to reduce wear on the shackle arrangement pulling in a horizontal direction when in use;

second and third portions of the aperture slope upwardly and downwardly respectively to reduce wear on the shackle arrangement pulling in a vertical direction;

wherein the receiver aperture is not more than 23 mm, in at least one of a horizontal direction along the length of the body and a vertical direction from the top to the bottom of the inside of the aperture; and wherein the body defines a tail configured for being received within the first vehicle and a head configured for protruding from the first vehicle.

2. An automotive tow hitch device as claimed in claim 1, wherein either the first vehicle or the second vehicle can be used to tow and extract the other vehicle when stuck using the shackle arrangement.

3. An automotive tow hitch device as claimed in claim 1, wherein the tail defines one or more fastener apertures, each of the fastener apertures being configured for receiving a respective fastener.

4. An automotive tow hitch device as claimed in claim 1, wherein the tail is square.

5. An automotive tow hitch device as claimed in claim 1, wherein the tail has a chamfered end.

6. An automotive tow hitch device as claimed in claim 1, wherein the head defines the receiver.

7. An automotive tow hitch device as claimed in claim 1, wherein the head is rounded.

8. An automotive tow hitch device as claimed in claim 1, wherein the head defines an inclined end to facilitate reflection of light.

9. An automotive tow hitch device as claimed in claim 1, wherein the receiver aperture has rounded edges configured to impede damage to the shackle arrangement under tension.

10. An automotive tow hitch device as claimed in claim 1, wherein the device is integrally formed from billet metal.

11. An automotive tow hitch device as claimed in claim 1, wherein the device is anodized.

12. An automotive tow hitch device as claimed in claim 1, wherein the shackle arrangement includes a soft shackle.

13. An automotive tow hitch device as claimed in claim 12, wherein the soft shackle is formed from at least one of a resilient material and rope.

14. An automotive tow hitch device as claimed in claim 12, wherein the soft shackle includes a shackle head configured for coupling to a tail to form an endless loop passing through the receiver aperture.

15. An automotive tow method, comprising:

coupling a body of a device to a vehicle; and coupling a shackle arrangement, received in a receiver of the body, to another vehicle, wherein the receiver includes a receiver aperture;

the receiver aperture extends horizontally through the body with an aperture opening located on either side of the body, wherein each aperture opening includes three sloped portions to reduce wear on the shackle arrangement when in use;

a first portion of each aperture slopes to reduce wear on the shackle arrangement pulling in a horizontal direction when in use;

second and third portions of the aperture slope upwardly and downwardly respectively to reduce wear on the shackle arrangement pulling in a vertical direction;

wherein the receiver aperture is not more than 23 mm in at least one of a horizontal direction along the length of the body and a vertical direction from the top to the bottom of the inside of the aperture; and wherein the body defines a tail configured for being received within the first vehicle and a head configured for protruding from the first vehicle.

16. An automotive tow hitch system, comprising:

a shackle arrangement; and an automotive tow hitch device including a body configured for coupling to a first vehicle, and defining a receiver configured for receiving the shackle arrangement for coupling to a second vehicle, wherein the receiver includes a receiver aperture;

the receiver aperture extends horizontally through the body with an aperture opening located on either side of the body, wherein each aperture opening includes three sloped portions to reduce wear on the shackle arrangement when in use;

a first portion of each aperture slopes to reduce wear on the shackle arrangement pulling in a horizontal direction when in use;

second and third portions of the aperture slope upwardly and downwardly respectively to reduce wear on the shackle arrangement pulling in a vertical direction;

wherein the receiver aperture is not more than 23 mm in at least one of a horizontal direction along the length of the body and a vertical direction from the top to the bottom of the inside of the aperture; and wherein the body defines a tail configured for being received within the first vehicle and a head configured for protruding from the first vehicle.

* * * * *